United States Patent
Tyler

(10) Patent No.: US 7,588,461 B2
(45) Date of Patent: Sep. 15, 2009

(54) MATING CONNECTORS WITH A CONTINUOUS EMI SHIELD

(75) Inventor: Adam Price Tyler, Rochester Hills, MI (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 12/043,172

(22) Filed: Mar. 6, 2008

(65) Prior Publication Data

US 2008/0220652 A1    Sep. 11, 2008

Related U.S. Application Data

(60) Provisional application No. 60/905,235, filed on Mar. 6, 2007.

(51) Int. Cl.
*H01R 13/648* (2006.01)
(52) U.S. Cl. ................................... 439/607.41
(58) Field of Classification Search ................. 439/610, 439/607, 608, 609, 654, 701
See application file for complete search history.

(56) References Cited

U.S. PATENT DOCUMENTS

| | | | |
|---|---|---|---|
| 3,871,735 A | | 3/1975 | Herrmann, Jr. |
| 3,888,559 A | * | 6/1975 | Geib ........................ 439/258 |
| 3,932,933 A | * | 1/1976 | Broad ......................... 29/859 |
| 4,674,807 A | | 6/1987 | Boteler et al. |
| 4,834,678 A | * | 5/1989 | Emadi et al. ................ 439/701 |
| 5,228,871 A | | 7/1993 | Goodman |
| 5,580,266 A | | 12/1996 | Shelly |
| 5,597,322 A | | 1/1997 | Inaba et al. |
| 5,685,739 A | | 11/1997 | Davis et al. |
| 5,855,493 A | * | 1/1999 | Shelly ........................ 439/465 |
| 6,027,375 A | * | 2/2000 | Wu ............................ 439/607 |
| 6,210,204 B1 | | 4/2001 | Ko et al. |
| 6,309,255 B1 | | 10/2001 | Yu |
| 6,749,464 B2 | * | 6/2004 | Obata ........................ 439/610 |
| 6,821,160 B2 | * | 11/2004 | Fink et al. .................. 439/701 |
| 7,064,266 B2 | | 6/2006 | Wada |
| 7,147,513 B2 | | 12/2006 | Wada et al. |
| 7,204,716 B1 | * | 4/2007 | George et al. ............... 439/610 |
| 7,249,977 B2 | * | 7/2007 | Schmieding et al. ........ 439/654 |
| 2006/0172602 A1 | | 8/2006 | Sakakura et al. |
| 2008/0050957 A1 | | 2/2008 | Natter et al. |

OTHER PUBLICATIONS

International Search Report, International Application No. PCT/US2008/002946, International Filing Date Jun. 3, 2008.

* cited by examiner

*Primary Examiner*—Chandrika Prasad

(57) ABSTRACT

A high voltage (HV) shielded electrical connector assembly is disclosed. The HV connector assembly includes a HV connector sub-assembly including a HV cap connector and a HV plug connector, a HV interlock (HVIL), and a low voltage (LV) connector sub-assembly. The HV cap connector includes an HV cap outer housing, and HV cap inner housing, and a HV cap shield disposed therebetween, the HV cap shield secured within the HV cap outer housing, and the HV cap inner housing secured within the HV cap shield. The HV plug connector includes an HV plug outer housing, and HV plug inner housing, and a HV plug shield disposed therebetween, the HV plug shield secured within the HV plug outer housing and the HV plug inner housing secured within the HV plug shield. The HV cap shield and the HV plug shield form a continuous EMI shield when the HV plug connector and the HV cap connector are mated.

17 Claims, 10 Drawing Sheets

MATING CONNECTORS WITH A CONTINUOUS EMI SHIELD

CROSS REFERENCE TO RELATED APPLICATIONS

This application claims the priority of U.S. provisional Pat. application No. 60/905,235 filed Mar. 6, 2007, incorporated herein by reference in its entirety.

FIELD OF THE INVENTION

The present invention relates generally to electrical connectors. More specifically, the present invention relates to a high voltage shielded electrical connector.

BACKGROUND OF THE INVENTION

Electrical connectors are utilized to interconnect signals and power pathways to and from components. The pathways are shielded to prevent electrical interference from emitting from or penetrating into the pathways. Interference emitting from a pathway is most often a problem for pathways carrying high voltages. Interference penetrating into a pathway is most often a problem for pathways carrying signal level voltages. The shielding provided to the pathways is generally sufficient to protect the signal pathways, which are more sensitive to interference from power pathways, from interference. However, interference between power and signal pathways may be a significant concern in applications where power and signal pathways are in physical close proximity. Particularly, interference between power and signal pathways may be a significant concern proximate to electrical connectors. Shielding may not be sufficient to prevent interference from escaping from a high voltage connector and interfering with a low voltage signal.

Increased fuel costs and increased efforts at reducing environmental pollution have led the automotive industry towards electric and hybrid electric vehicles (HEV). The electrical systems of these vehicles include components that operate at high voltages and require high voltage pathways including connectors. The high voltage pathways and connectors may be transferring power between components. These systems also include components that operate at low voltages and require low voltage pathways and connectors. The low voltage pathways and connectors may be transferring control signals between components. Consequently, both high and low voltage systems exist proximate to one another and must be protected from electrical interference.

Therefore, there is a need to provide a high voltage electrical connector having shielding for protecting low voltage signals from interference.

SUMMARY OF THE INVENTION

In one embodiment of the present invention, a high voltage shielded electrical connector assembly is disclosed that includes a high voltage (HV) shielded connector sub-assembly. The HV shielded connector sub-assembly includes a high voltage cap connector having a high voltage cap outer housing and a high voltage cap shield, the high voltage cap shield secured within the high voltage cap outer housing, and a high voltage plug connector including a high voltage plug outer housing and a high voltage plug shield, the high voltage plug shield secured within the high voltage plug housing. The high voltage plug connector is configured to mate with the high voltage cap connector. The high voltage cap shield and high voltage plug shield form a continuous EMI shield when the high voltage cap connector and the high voltage plug connector are mated.

The high voltage cap connector further includes a high voltage cap inner housing secured within the high voltage cap shield, and the high voltage plug connector includes a high voltage plug inner housing secured within the high voltage plug shield.

Further aspects of the method and system are disclosed herein. The features as discussed above, as well as other features and advantages of the present invention will be appreciated and understood by those skilled in the art from the following detailed description and drawings.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
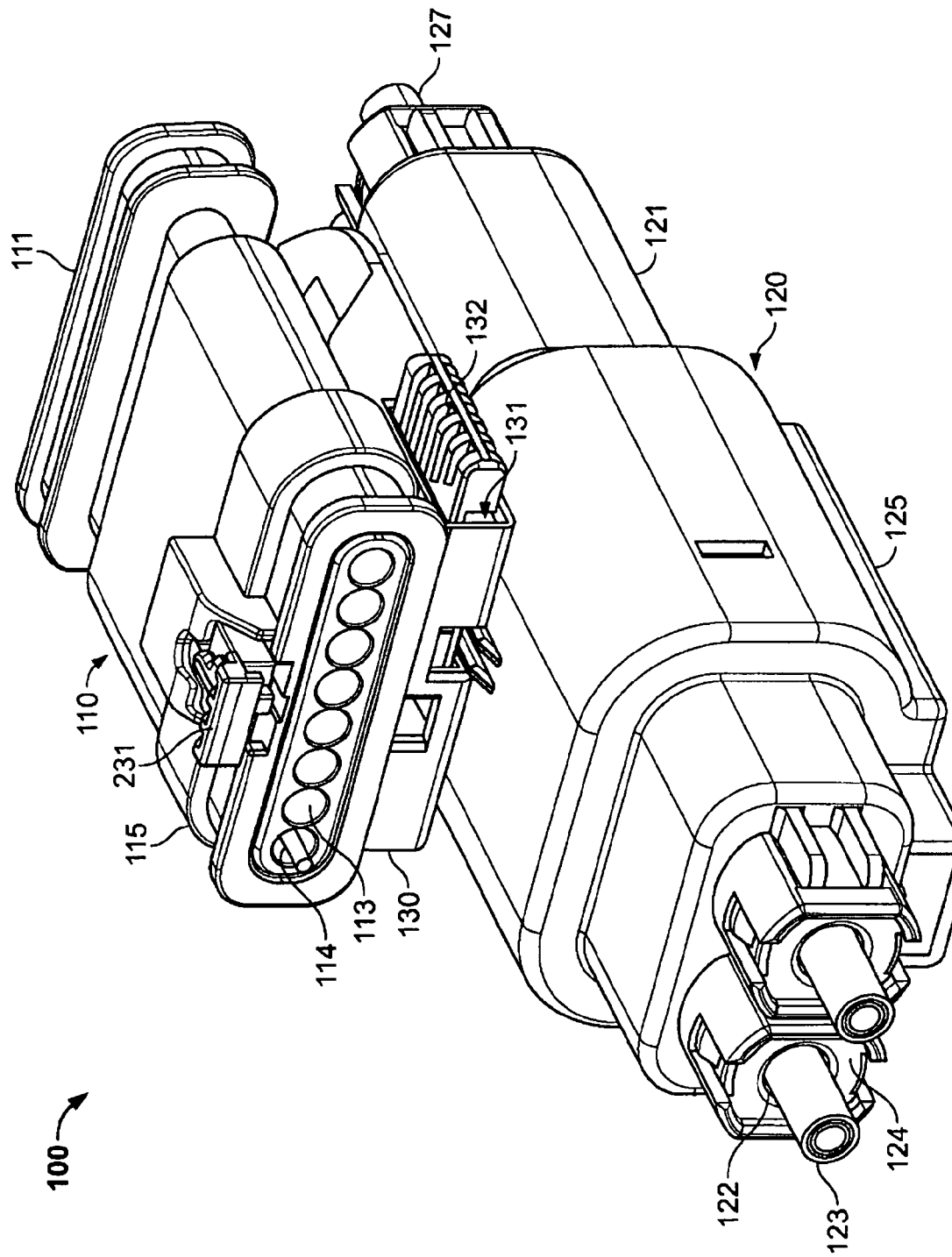
FIG. 1 illustrates a perspective view of an exemplary embodiment of a high voltage shielded connector assembly of the present invention.
Figure 2:
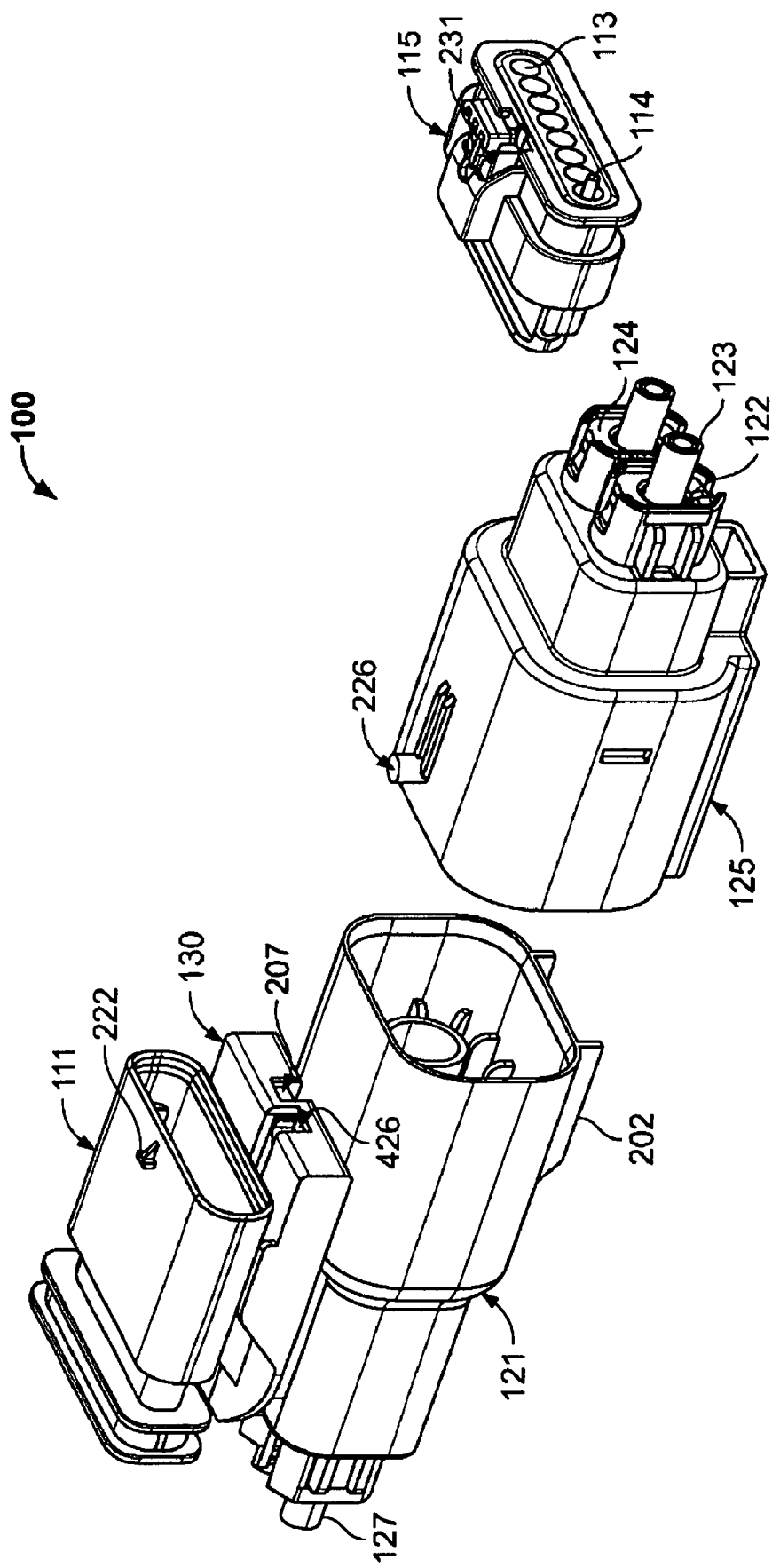
FIG. 2 illustrates a perspective view of the exemplary embodiment of the connector assembly of FIG. 1 unmated and taken from a different angle.

An exemplary embodiment of a high voltage shielded electrical connector assembly 100 according to the present invention is shown in FIGS. 1 and 2. The connector assembly 100 includes a signal or low voltage (LV) connector sub-assembly 110 and a high voltage (HV) shielded connector sub-assembly 120.

The LV connector sub-assembly 110 includes a LV cap connector 111 and a LV plug connector 115. The LV plug connector 115 includes a latch 231 for securing the LV cap connector 111 thereto. The LV plug connector 115 further includes a LV pin (not shown) on a bottom surface (not shown) of the LV plug connector 115. In this exemplary embodiment, the LV plug connector 115 includes a number of LV plug conductor openings 113 for receiving LV plug conductors 114. In this exemplary embodiment, the LV plug connector 115 is shown having eight LV plug conductor openings 113, however, in alternative embodiments, fewer or greater than eight LV plug conductor openings 113 may be present. Additionally, in this exemplary embodiment, only one LV plug conductor 114 is shown, however, as many LV plug conductors 114 may be used as are the number of corresponding LV plug conductor openings 113. The LV plug connector 115 includes LV plug terminals (not shown) terminating corresponding LV plug conductors 114 housed within the plug connector 115. The LV plug terminals may be socket, pin or other terminals as appreciated by one of ordinary skill in the art.

As can be seen in FIG. 2, the LV cap connector 111 includes a LV cap latch protrusion 222. The LV cap latch protrusion is configured to be releasably engaged by the LV plug latch 231 when the LV cap connector 111 and the LV plug connector 115 are mated. The LV cap connector 111 includes LV cap conductors (not shown) connected to corresponding LV cap terminals (not shown) housed within the cap connector 111. The LV cap terminals are configured to mate with corresponding LV plug terminals (not shown) within the LV plug connector 115. As would be appreciated by one of ordinary skill in the art, the LV cap terminals may be a socket, pin or other terminal which mates with the corresponding LV plug terminal of the LV plug connector 115.

The HV connector sub-assembly 120 includes a HV cap connector 121 and a HV plug connector 125. The HV plug connector 125 includes an HV pin 226 and a number of HV plug connector rear openings 122 for receiving HV plug conductors 123. The HV plug conductors 123 are terminated by corresponding HV socket terminals 912 (shown at FIG. 9) within the HV plug connector 125. The HV plug conductors 123 are environmentally sealed within the HV plug connector 125 by seals 247 (shown at FIG. 9) secured within the HV plug connector 125 by seal retainers 124. In this exemplary embodiment, the HV plug connector 125 is shown having two HV plug connector rear openings 122, however, in alternative embodiments, fewer or greater than two HV plug connector rear openings 122 may be included. Additionally, in this exemplary embodiment, two HV plug conductors 123 are shown, however, as many HV plug conductors 123 may be used as there are corresponding HV plug connector rear openings 122.

In this exemplary embodiment, the HV cap connector 121 is coupled to a high voltage interlock (HVIL) 130 by integrally molding the HV cap connector 121 with the HVIL 130. The HVIL 130 couples the LV cap connector 111 to the HV cap connector 121. In an alternative embodiment, the HVIL 130 may be attached to the HV cap connector 121 by fasteners, clips, tabs, latches, gluing or other similar fastening methods as would be appreciated by one of ordinary skill in the art. As can be seen in FIG. 1, the HVIL 130 includes an interlock slot 131 and a HVIL blockout slider 132. The HVIL blockout slider 132 is shown inserted into the interlock slot 131 in a fully mated connector position of the connector assembly 100 in FIG. 1.

As can be seen in FIG. 2, the HV cap connector 121 includes HV cap connector rails 202 configured to be received in the HV plug connector 125 when the HV cap connector 121 and HV plug connector 125 are mated. The HV cap connector 121 further includes HV connector rear openings (not shown) for receiving HV cap conductors 127. In this exemplary embodiment, two HV cap conductors 127 are used (only one shown on FIG. 2, see FIG. 7 for the second HV cap conductor 127), however, as many HV cap conductors 127 may be used as there are corresponding HV cap connector rear openings (not shown). The HV cap conductors 127 are terminated by corresponding pin terminals (not shown) housed within the HV cap connector 121. It should be appreciated by one of ordinary skill in the art that, although in this exemplary embodiment, the HV cap connector 121 houses socket terminals and the HV plug connector 125 houses pin terminals, it is within the scope of the invention that that any corresponding mating HV terminals may be housed within the HV plug connector 125 and the HV cap connector 121, respectively.

As can also be seen in FIG. 2, the HVIL 130 includes a HV pin opening 207 for receiving the HV pin 226 of HV plug connector 125. The HVIL 130 further includes a LV pin opening 426 configured to receive the LV pin (not shown) on the LV plug connector 115. The HVIL 130 is configured to prevent the LV plug connector 115 from being mated to the LV cap connector 111 before the HV plug connector 125 is mated to the HV cap connector 121. The HVIL 130 configuration is further described in more detail below.

Figure 3:
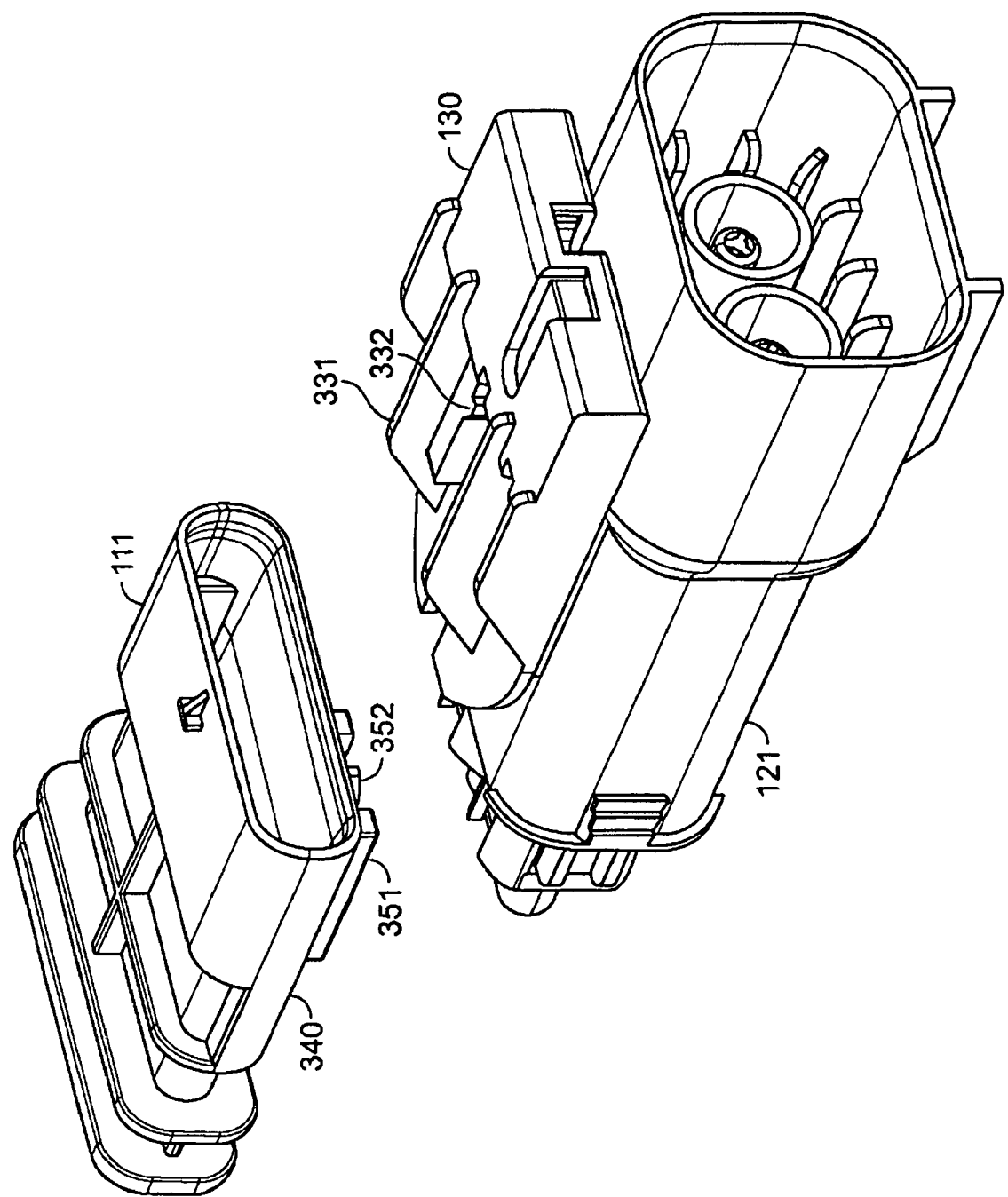
FIG. 3 illustrates a perspective view of the low voltage cap connector uncoupled from the high voltage cap connector.

FIG. 3 shows the LV cap connector 111 uncoupled from the HV cap connector 121. As can be seen in FIG. 3, the HVIL 130 includes HVIL guide rails 331 and a HVIL latch 332. The LV cap connector 110 includes a bottom surface 340 having LV cap connector guide rails 351 and a LV cap connector latch 352. The LV cap connector guide rails 351 and LV cap connector latch 352 are configured to guide and engage the HVIL guide rails 331 and HVIL latch 332, respectively to couple the LV cap connector 111 to the HV cap connector 121 via the HVIL 130. The HVIL guide rails 331 and HVIL latch may be of a standardized configuration to receive guide rails and a latch from a standard LV connector of a particular industry.

Figure 4:
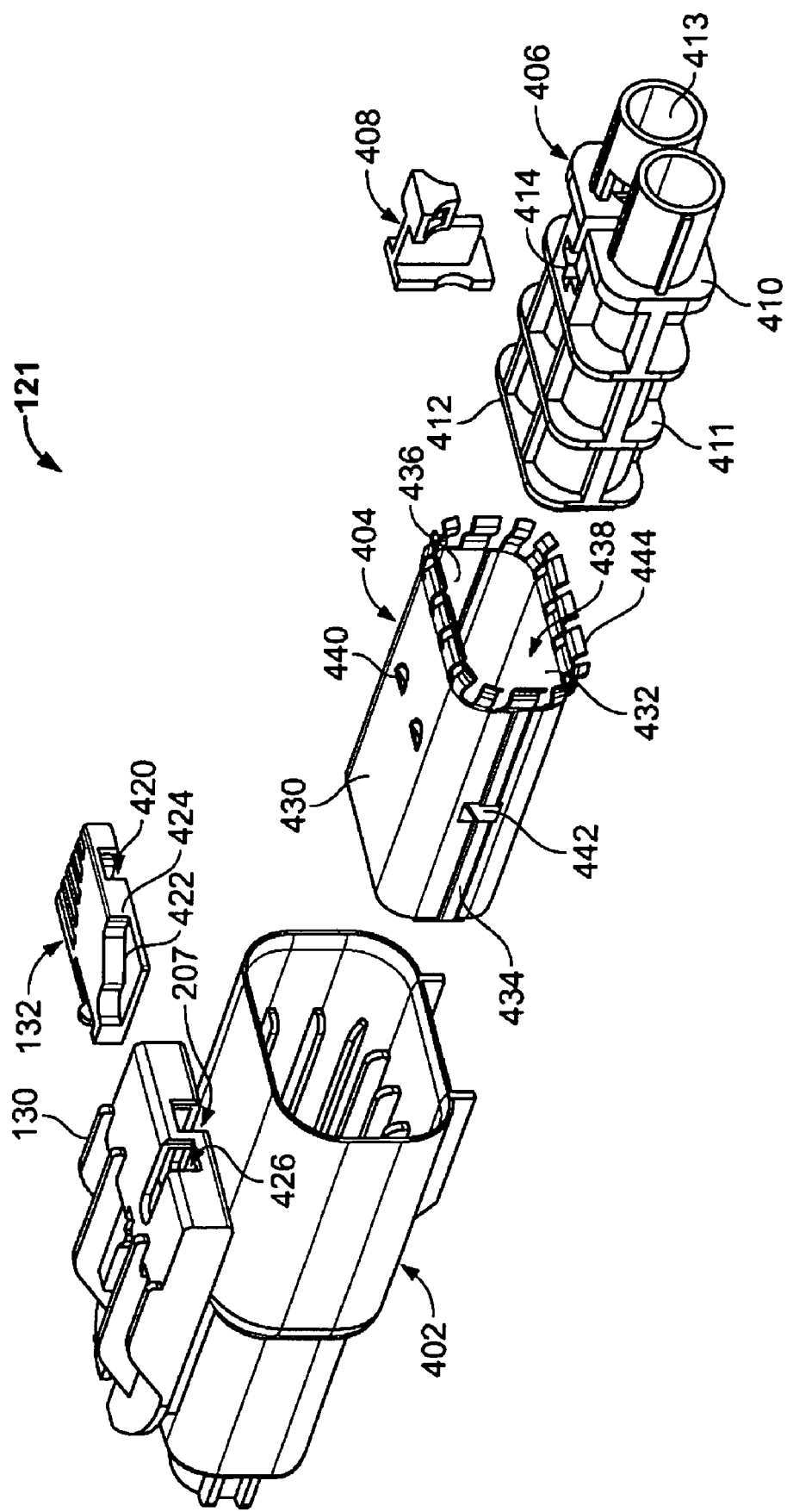
FIG. 4 illustrates an exploded view of an exemplary high voltage cap connector.

FIG. 4 shows an exploded view of the HV cap connector 121 and the HVIL 130. As can be seen in FIG. 4, the HV cap connector 121 includes a HV cap outer housing 402, an EMI high voltage (HV) cap shield 404, and a high voltage (HV) cap inner housing 406. The HV cap connector 121 further includes a terminal retention secondary lock (TRSL) 408 and a HVIL blockout slider 132.

The HV cap inner housing 406 includes a front wall 410, an interior wall 411, a rear wall 412, terminal openings 413, and an inner housing slot 414. The TRSL 408 and slot 414 are configured to lock terminals (not shown) in a fixed position in the terminal openings 413 when the TRSL 408 is inserted into the inner housing slot 414 when terminals (not shown) are completely installed in the openings 413.

As can further be seen in FIG. 4, the HVIL blockout slider 132 includes an HV plug connector cam pin slot 420, a LV plug connector cam pin slot 422, and a HV blocking slider surface 424 disposed therebetween. The HV plug connector cam pin slot 420 is similarly configured in the HVIL blockout slider 132 as the LV plug connector cam pin slot 422 as shown as to provide a similar cam action. In other words, the camming surface of the slot 420 is similarly configured as the camming surface of the slot 422 to provide a camming action. The HVIL blockout slider 132 is configured to be inserted into an interlock slot 131 as shown in FIG. 1.

Figure 5:
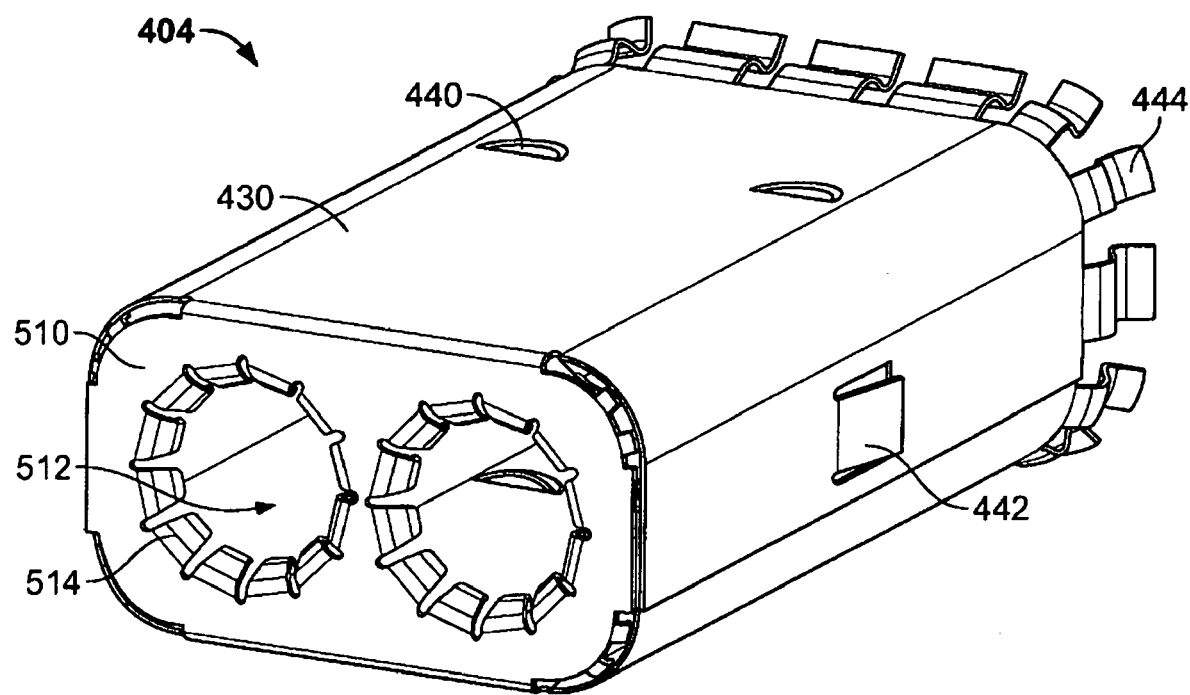
FIG. 5 illustrates a rear perspective view of a cap shield of FIG. 4.

The HV cap shield 404 includes a top wall 430, a bottom wall 432, a first sidewall 434, a second sidewall 436, a front opening 438 and a rear wall 510 (shown in FIG. 5). The top wall 430 includes indentations 440. The bottom wall 432 includes indentations (not shown) similarly configured as the indentations 440 in the top wall 430. The indentations 440 engage an interior wall 411 of the HV inner housing 406 when the HV inner housing 406 is fully inserted into the HV cap shield 404 through front opening 438 to secure and retain the HV inner housing 406 within the HV cap shield 404. The number and geometric shape of indentations 440 may vary, so long as the indentations 440 secure the HV inner housing 406 within the HV cap shield 404. The HV cap shield 404 also includes tabs 442 located on the sidewalls 434, 436 (a similar tab 442 is present but not shown on the second side wall 436) for securing and retained the HV cap shield 404 within the HV cap outer housing 402. It should be appreciated that the number and shape of the tabs 442 may vary, as long as the tabs 442 provide a securing feature for the HV cap shield 404 within the HV cap outer housing 402. The HV cap shield 404 further includes front springs 444 disposed around the front opening 438 as shown. In this exemplary embodiment, the front springs 444 are disposed substantially continuously around the front opening 438, however, in alternative embodiments, the number and configuration of the front springs 444 may vary.

Figure 10:
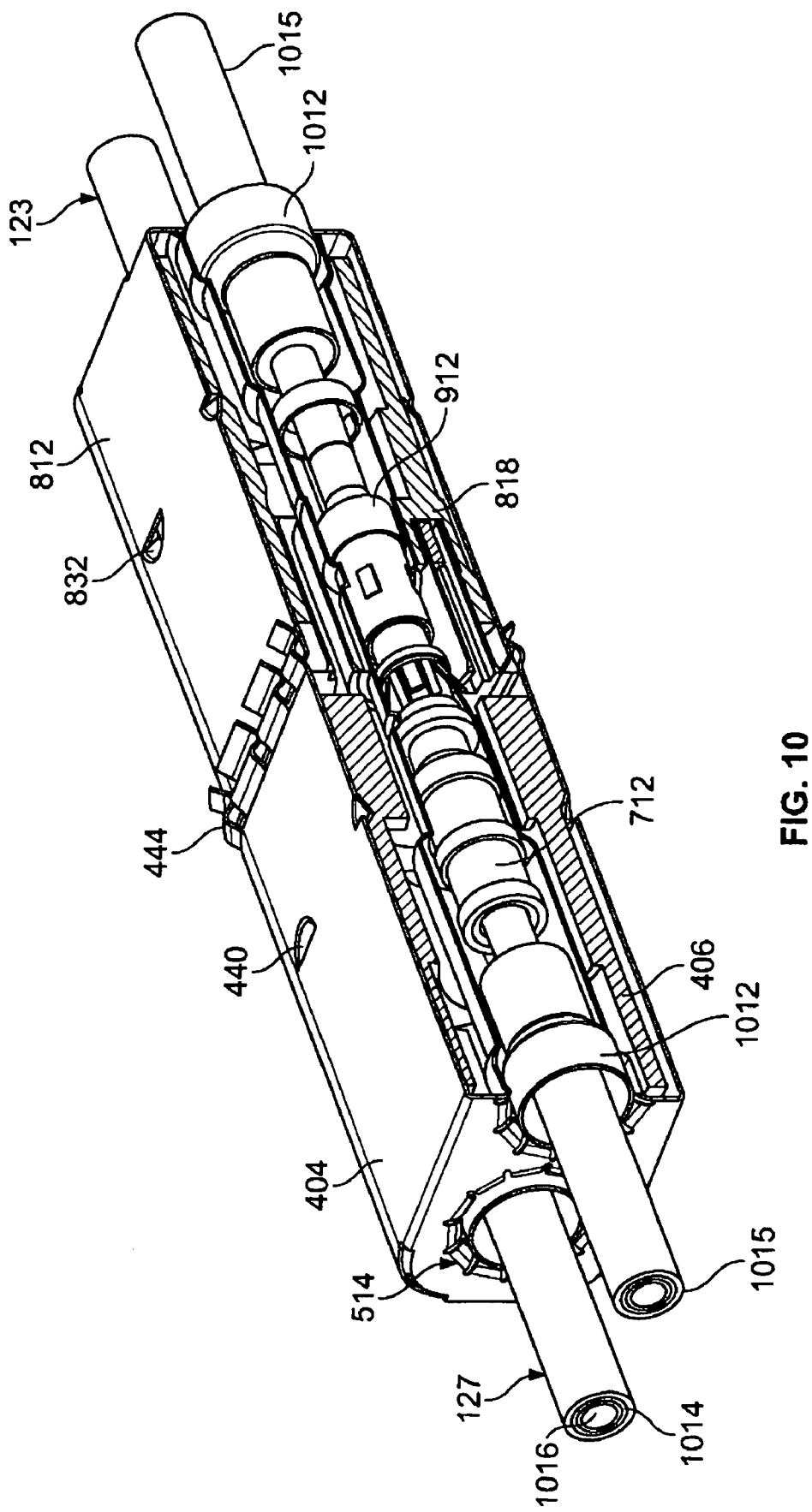
FIG. 10 illustrates a partial cutaway view of mated shields and components disposed therewithin of the connector assembly of FIG. 1.

FIG. 5 shows a rear perspective view of the HV cap shield 404. As can be seen in FIG. 5, the rear wall 510 includes rear openings 512. Rear springs 514 are disposed around rear openings 512 as shown in FIG. 5. Rear springs 514 are configured to provide electrical continuity with corresponding ferrules 1012 (see FIG. 10) disposed through rear openings 512 as shown in FIG. 10. Although rear springs 514 are shown as substantially surrounding the rear openings 512, it should be appreciated by one of ordinary skill that the rear springs 514 may be disposed around the rear openings 512 in various patterns and shapes to provide support and electrical contact to the.

Figure 6:
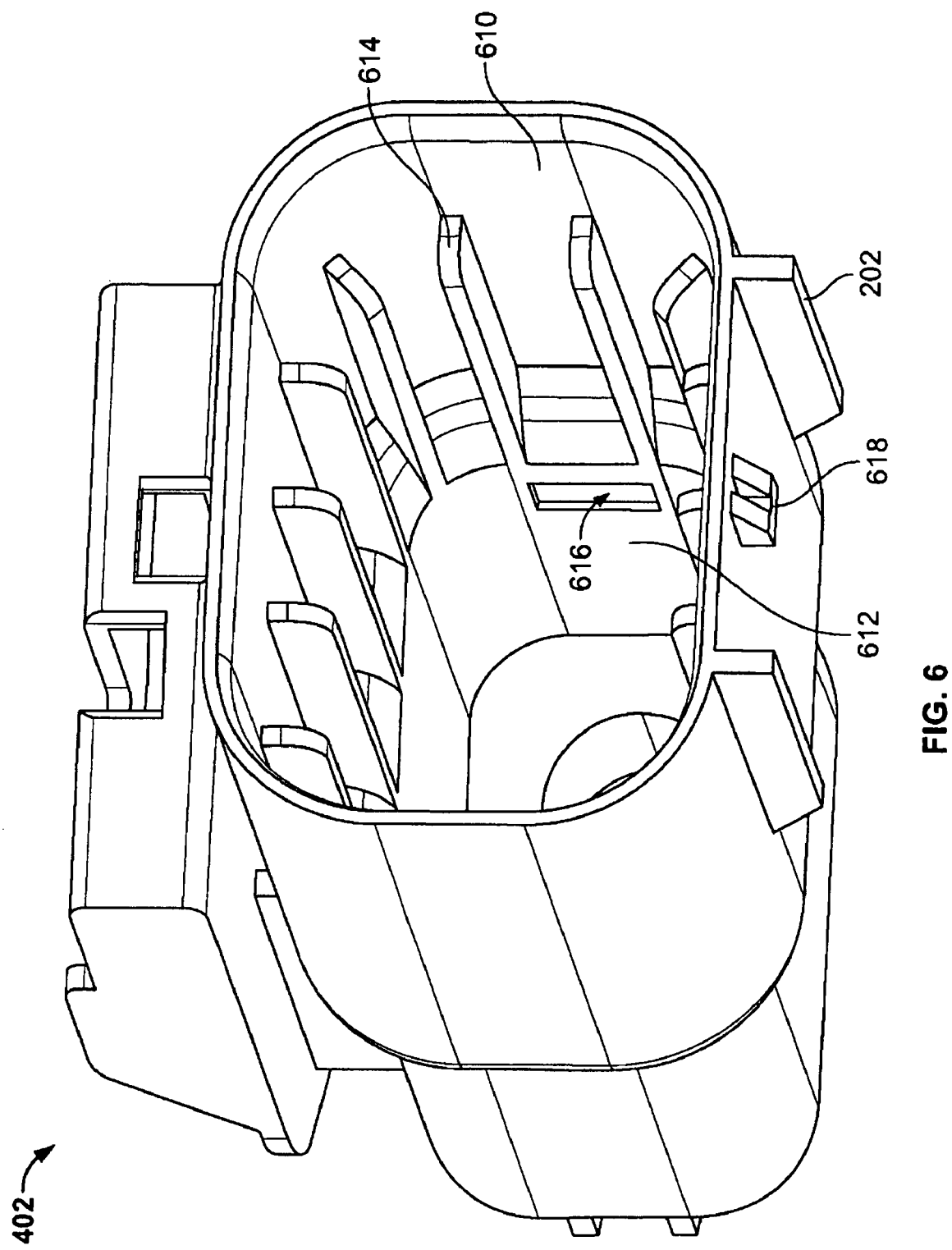
FIG. 6 illustrates a perspective view of a cap housing of FIG. 4.

FIG. 6 shows a bottom perspective view of the HV cap connector outer housing 402 without HVIL blockout slider 132. As can be seen in FIG. 6, the HV cap connector outer housing 402 includes a first wall 610 and a second wall 612. The first wall 610 includes ribs 614 disposed thereupon. As can further be seen in FIG. 6, the ribs 614 extend at least partially along the first wall 610. However, the ribs 614 may be disposed and configured in alternative structure to provide alignment with the plug connector 125 (FIG. 2) during mating. The second wall 612 includes recesses 616. A second recess 616 is present, but not shown, on the opposing side of the second wall 612. The recesses 616 are configured to receive tabs 442 of the cap shield 404 to secure and retain the cap shield 404 within the outer housing 402. It should be appreciated that the number and shape of the recesses 616 may vary to engage the number and shape of corresponding tabs 442 (FIG. 5) of the HV cap shield 404. The outer housing 402 also includes a housing latch protrusion 618 (further described below) and guide rails 202 (previously discussed).

Figure 7:
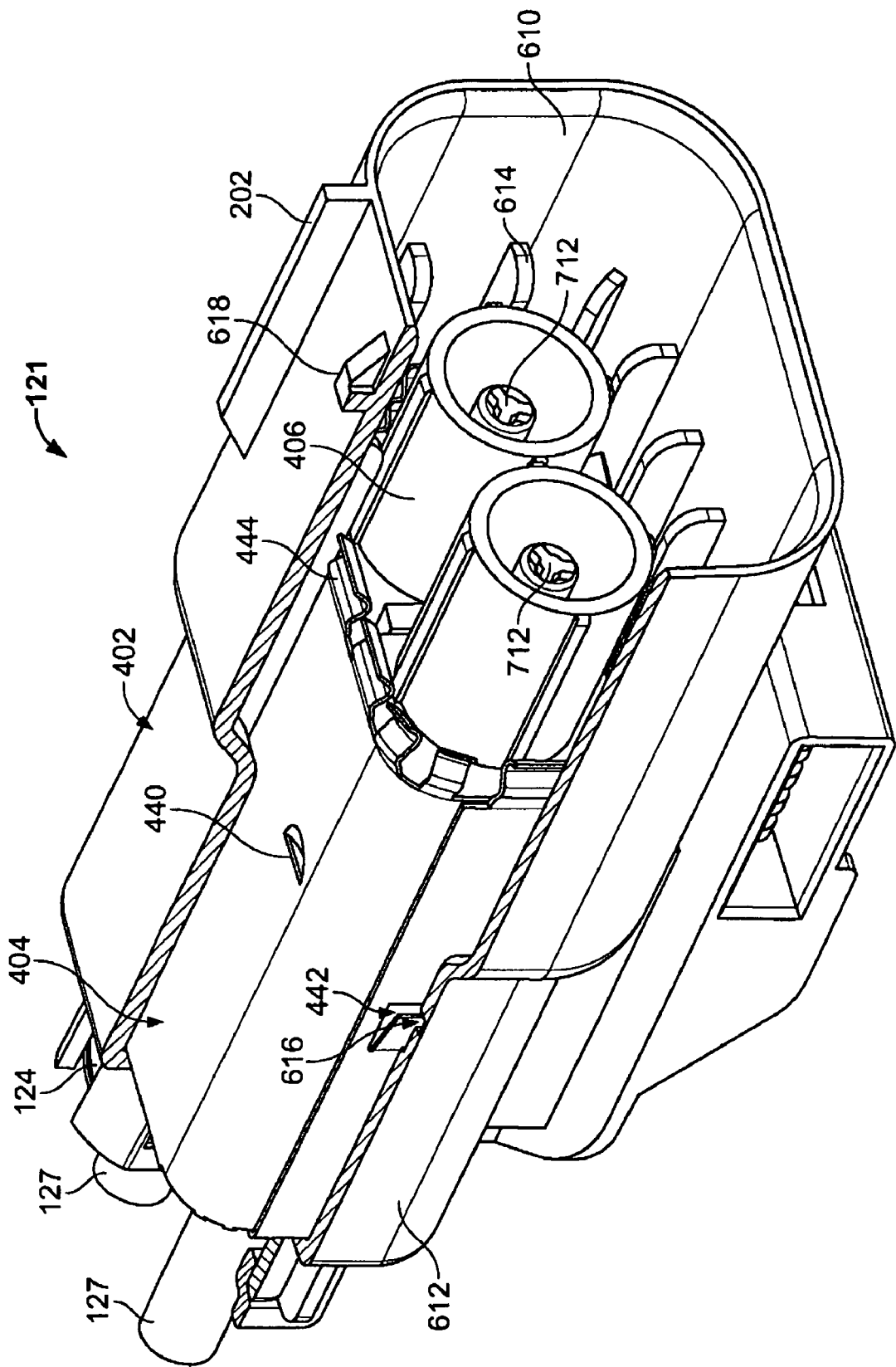
FIG. 7 illustrates a bottom perspective ¼ partial cutaway view of a high voltage cap connector of the connector assembly of FIG. 2.

FIG. 7 shows a bottom perspective partial cutaway view of the assembled HV cap connector 121 of FIG. 4 without HVIL blockout slider 132 and which further includes HV cap conductors 127 terminated by corresponding HV pin terminals 712. The HV cap conductors 127 are environmentally sealed in the HV cap outer housing 402 by seals (not shown) held in place by seal retainers 124. The HV pin terminals 712 have been locked into a fixed position within the HV cap inner housing 406 by a TRSL (not shown). As can be seen in FIG. 7, the ribs 614 position the front springs 444 at a predetermined distance from the first wall 610. This predetermined distance enables the front springs 444 to be compliant while in proximity to the first wall 610. The HV cap conductors 127 and HV pin terminals 712 may be removed from the HV cap connector 121 by removing the TRSL (not shown) and seal retainer 124.

As can be further seen in FIG. 7, tabs 442 of HV cap shield 404 are engaged in recesses 616 in the second wall 612 to secure and retain the HV cap shield 404 within the HV cap outer housing 402. As can also be seen in FIG. 7, the HV cap shield 404 is in contact with the second wall 612, which assists in stabilizing and securing the HV cap shield 404 within the HV cap outer housing 402. Thus, by securing and retaining the HV cap shield 404 within the HV cap outer housing 402, the HV cap inner housing 406 and TRSL 408 are also secured and retained within the HV cap outer housing.

Figure 8:
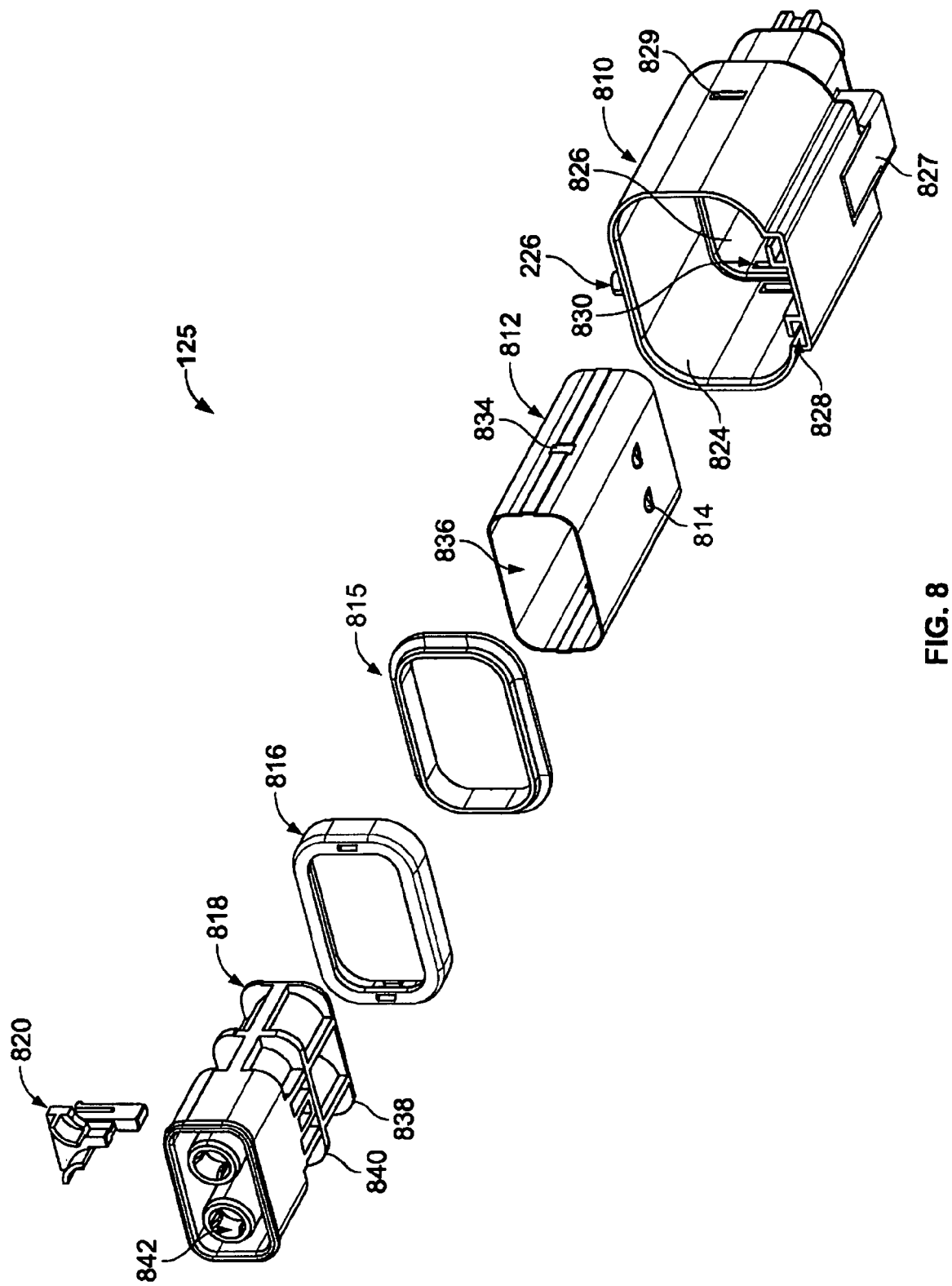
FIG. 8 illustrates a bottom perspective exploded view of a high voltage plug connector of the connector assembly of FIG. 2.

FIG. 8 shows an exploded bottom perspective view of the exemplary HV plug connector 125 of FIG. 2 without the HV plug conductors 123 and HV socket terminals (not shown). As can be seen in FIG. 8, the HV plug connector 125 includes an HV plug outer housing 810, an EMI plug shield 812, a seal 815, a cap 816, an HV plug inner housing 818 and a terminal retention secondary lock (TRSL) 820.

The HV plug outer housing 810 includes a HV pin 226, a first wall 824, a second wall 826, and a compliant HV plug latch 827. The HV pin 226 is configured to be received in the HV pin opening 207 (FIG. 4) of the HVIL 130 (FIG. 4) when the HV plug connector 125 (FIG. 2) and the HV cap connector 121 (FIG. 2) are mated. The HV plug latch 827 is configured to engage protrusion 618 (FIG. 6) of the HV cap connector outer housing 402 (FIG. 6) when the HV plug connector 125 (FIG. 1) and the HV cap connector 121 (FIG. 1) are mated. It should be appreciated by one of ordinary skill in the art, that other mating structures may be used in place of the HV plug latch 827 and the protrusion 618 to secure the HV plug connector 125 to the HV cap connector 121.

The first wall 824 includes guide rail slots 828 configured to receive corresponding guide rails 202 (FIG. 2) of the HV cap connector 121 when the HV plug connector 121 (FIG. 1) and the HV cap connector 120 (FIG. 1) are mated. It should be appreciated by one of ordinary skill in the art that other structures may alternatively be used instead of the guide rail slots 828 and guide rails 202 to align the HV plug connector 125 and the HV cap connector 121 during mating.

The first wall 824 also includes slots 829 that pass though the first wall of the outer housing 810. The second wall 826 includes recesses 830 (a corresponding recess is present but not shown on the opposite side of the housing 810).

The HV plug shield 812 includes plug shield indentations 814 (similar indentations are present but not shown on the opposite side of the plug shield 812), tabs 834 (a similar tab is present but not shown on the opposite side of the plug shield 812), and an opening 836. The HV plug shield 812 also includes a rear wall 510 (not shown) having rear openings 512 and rear springs 514 similarly configured as on the HV cap shield 404 as shown in FIG. 5. The indentations 814 and tabs 834 are similarly configured as on the HV cap shield 404 shown in FIGS. 4 and 5, including rear wall openings (not shown) and rear springs (not shown).

The HV plug inner housing 818 includes a rear wall 838, a middle wall 840, and openings 842. The HV plug inner housing 818 also includes a slot (not shown) similarly configured as the slot 414 shown in FIG. 4, configured to receive TRSL 820 to secure HV socket terminals (not shown) when present in the openings 842.

Figure 9:
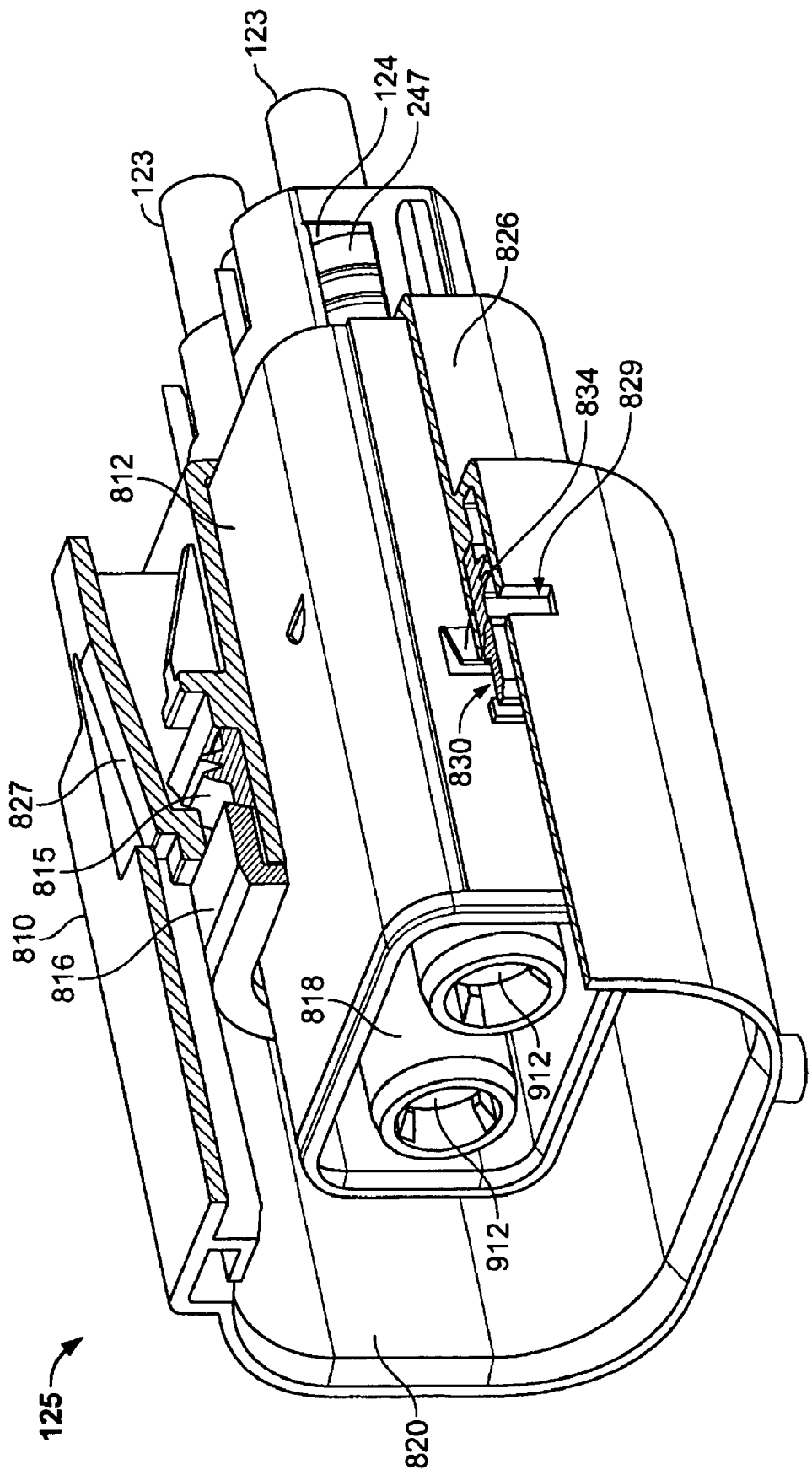
FIG. 9 illustrates a bottom perspective partial cutaway view of the high voltage plug connector of FIG. 2.

FIG. 9 shows the assembled HV plug connector 125 of FIG. 8, additionally including HV plug conductors 123 and corresponding HV socket terminals 912 disposed within HV plug inner housing 818. The HV socket terminals 912 are secured within the HV plug inner housing 818 by a TRSL 820 (FIG. 8). The HV plug conductors 123 are environmentally sealed in the housing 810 by seals 247 as shown. The seals 247 are retained within the inner housing 840 by seal retainers 124. The HV plug conductors 123 and terminals 912 may be removed from the HV plug connector 125 by releasing the TRSL (not shown) and seal retainers 124.

As can be seen in FIG. 9, the recesses 830 of HV plug outer housing 810 engage tabs 834 of the HV plug shield 812 to secure the HV plug shield 812 within the HV outer housing 810 when inserted there within. As can also be seen in FIG. 9, the HV plug shield 812 is in contact with the second wall 826 of the HV plug outer housing 810, which assists in securing and stabilizing the plug shield 812 within the inner housing 810. It should be appreciated by one of ordinary skill in the art that the number and structure of the tabs 834 and corresponding recesses 830 may be varied so long as the configuration stabilizes and secures the HV plug shield 812 within the HV plug outer housing 810. In this manner, the HV plug shield 812 secures the HV plug inner housing 818 within the HV plug outer housing 810.

As can be further seen in FIG. 9, the seal 815 is configured to environmentally seal the HV plug shield 812 and the HV inner housing 818 within the HV plug outer housing 810. The cap 816 secures the seal 815 against the HV inner housing 818. The cap 816 includes tabs (not shown) that engage slots 830 to secure the cap 816 within the outer housing 810. A tool (not shown) may be inserted into the slots 829 to disengage the cap 816, allowing the cap 816 and the seal 815 to be removed from the HV cap outer housing 810.

The assembling of the HV shielded electrical connector assembly 100 (FIG. 1) will now be explained by referring to FIGS. 1, 2, 4, 6, 8 and 10. The positioning of the HVIL blockout slider 132 during mating of the HV plug connector 125 and the LV plug connector 115 to the HV cap connector 121 and the LV cap connector 111, respectively, will be discussed by further referring to FIG. 4. As an initial step to assembling the assembly 100, the HVIL blockout slider 132 is fully inserted into the interlock slot 131 (FIG. 1) of the HVIL 130. In this fully inserted position, the HV plug connector cam pin slot 420 is substantially aligned with HV pin opening 207 of HVIL 130 and the HV blocking slider surface 424 substantially blocks the LV plug connector pin slot 426. When the HV pin 226 (FIG. 2) is inserted through the HV pin opening 207 into the HV plug connector cam pin slot 420 by assembling the HV plug connector sub-assembly 120 as shown in FIG. 1, the cam action of the slot 420 moves the HV blocking slider surface 424 out of the LV slot 426 to allow the LV plug connector 115 to be mated with the LV cap connector 111.

In this position, the LV plug connector cam pin slot 422 is substantially aligned with a LV pin opening 426 of the HVIL 130, allowing a LV plug connector pin (not shown) on the LV plug connector (FIG. 2) to be fully received into the slot 422 through pin opening 426 while mating the LV plug connector 115 (FIG. 2) to the LV cap connector 111 (FIG. 2), thereby connecting corresponding terminals of the LV cap and plug connectors 111, 115, respectively.

The HVIL 130 and HVIL blockout slider 132 configuration prevents the LV plug connector sub-assembly 110 (FIG. 1) from being assembled prior to the HV plug connector sub-assembly 120 (FIG. 1) first being assembled. This sequence of forming the HV connection prior to the LV connection is often important because, in many applications, the HV or power connection must be made before the LV or signal connection.

FIG. 10 shows an exemplary mated configuration of the HV cap shield 404 and HV plug shield 812 and internal components thereof, of the HV shielded electrical connector assembly 100 shown in FIG. 1. As can be seen in FIG. 10, the HV cap shield 404 surrounds the HV cap inner housing 406. Indentations 440 on the HV cap shield 404 secure the HV cap inner housing 406 within the HV cap shield 404. In a similar fashion, the HV plug shield 812 surrounds the HV plug inner housing 818, and indentations 832 secure the HV plug inner housing 818 within the HV plug shield 812.

The HV cap conductors 127 include conductor cores 1016 terminated by HV pin terminals 712. The HV cap conductors 127 further include conductor shields 1014 sandwiched in insulation 1015, as would be appreciated by one of ordinary skill in the art. The insulation 1015 is stripped or otherwise removed from the HV cap conductors 127 and ferrules 1012 are crimped or otherwise attached to the HV cap conductors 127 in electrical contact with the conductor shields 1014 to form a continuous electrical connection. Rear springs 514 of the HV cap shield 404 form a continuous electrical connection between the ferrules 1012 and the HV cap shield 404.

The HV plug conductors 123 include conductor cores (not shown) terminated by HV socket terminals 912. The HV plug conductors 123 further include conductor shields (not shown) sandwiched in insulation 1015, similar to the HV cap conductors 127, as would be appreciated by one of ordinary skill in the art. The insulation 1015 is stripped or otherwise removed from the HV plug conductors 123 and ferrules 1012 are crimped or otherwise attached to the HV plug conductors 123 in electrical contact with the conductor shields 1014 to form a continuous electrical connection. Rear springs (not shown) of the HV plug shield 812 for a continuous electrical connection between the ferrules 1012 and the HV plug shield 812.

FIG. 10 also shows the front springs 444 of the HV cap shield 404 engaged with and forming a continuous electrical connection with the HV plug shield 812. In alternative embodiments, the front springs 444 may be present on the HV plug shield 812, or front springs 444 may be present of both the HV cap shield 404 and the HV plug shield in alternating spacing to form the continuous electrical connection. The ferrules 1012, rear springs 514 of the HV cap shield 404, rear springs (not shown) of the HV plug shield 812, and the cap shield 404 and plug shield 812 themselves, form a continuous EMI shield around the electrical connection formed by the high voltage pin and socket terminals, 712, 1020, respectively.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A high voltage shielded electrical connector assembly, comprising:
    a high voltage shielded connector sub-assembly comprising:
        a high voltage cap connector comprising a high voltage cap outer housing and a high voltage cap shield, the high voltage cap shield secured within the high voltage cap outer housing; and
        a high voltage plug connector comprising a high voltage plug outer housing and a high voltage plug shield, the high voltage plug shield secured within the high voltage plug housing, and the high voltage plug connector configured to mate with the high voltage cap connector;

wherein the high voltage cap shield and high voltage plug shield form a continuous electromagnetic interference (EMI) shield when the high voltage cap connector and the high voltage plug connector are mated; and wherein both the high voltage cap shield and the high voltage plug shield include a rear wall, the rear wall comprising rear openings comprising rear springs disposed therearound, the rear springs configured to provide an electrical connection with a high voltage conductor retained within the rear openings.

2. The assembly of claim 1, wherein the high voltage cap connector further includes a high voltage cap inner housing secured within the high voltage cap shield, and the high voltage plug connector includes a high voltage plug inner housing secured within the high voltage plug shield.

3. The assembly of claim 2, wherein the formed continuous EMI shield surrounds the high voltage cap inner housing and the high voltage plug inner housing.

4. The assembly of claim 2, wherein the high voltage cap shield includes tabs configured to secure the high voltage cap shield within the high voltage cap outer housing and indentations configured to retain the high voltage cap inner housing within the high voltage cap shield, and wherein the high voltage plug shield includes tabs configured to secure the high voltage plug shield within the high voltage plug outer housing, and indentations configured to retain the high voltage plug inner housing within the high voltage plug shield.

5. The assembly of claim 1, wherein the high voltage cap shield and the high voltage plug shield are electrically connected by front springs disposed on any one of the high voltage cap shield, the high voltage plug shield, or both the high voltage cap shield and the high voltage plug shield.

6. The assembly of claim 2, wherein both the high voltage cap connector and the high voltage plug connector further includes a terminal retention secondary lock configured to secure terminals attached to high voltage electrical conductors within the high voltage cap inner housing and the high voltage plug inner housing, respectively.

7. The assembly of claim 1, wherein a high voltage interlock is coupled to the high voltage connector subassembly, and wherein the high voltage interlock is configured to couple a low voltage connector sub-assembly to the high voltage connector sub-assembly, the low voltage connector sub-assembly comprising a low voltage cap connector and a low voltage plug connector.

8. The assembly of claim 7, wherein the high voltage interlock is further configured to prevent the mating of the low voltage cap connector and the low voltage plug connector before the high voltage cap connector and the high voltage plug connector are mated.

9. The assembly of claim 7, wherein the high voltage interlock comprises a high voltage interlock slider configured to change position within the high voltage interlock in response to the high voltage plug connector being mated with the high voltage cap connector to allow the low voltage plug connector to mate with the low voltage cap connector.

10. A high voltage shielded electrical connector assembly for forming an electrical connection between high voltage conductors, comprising:

a low voltage connector sub-assembly comprising:
a low voltage cap connector; and
a low voltage plug connector configured to be mated with the low voltage cap connector;
a high voltage shielded connector sub-assembly comprising:
a high voltage cap connector including a high voltage cap shield and a high voltage interlock; and
a high voltage plug connector including a high voltage plug shield, the high voltage plug connector configured to be mated with the high voltage cap connector;
wherein the high voltage interlock is configured to couple the low voltage cap connector to the high voltage cap connector, and
wherein the high voltage cap shield and high voltage plug shield form a continuous EMI shield when the high voltage cap connector and the high voltage plug connector are mated; and
wherein both the high voltage cap shield and the high voltage plug shield include a rear wall including rear openings having rear springs disposed therearound, the rear springs configured to provide an eletrical connection with a high voltage conductor retained within the rear openings.

11. The assembly of claim 10, wherein the high voltage cap connector further includes a high voltage cap inner housing secured within the high voltage cap shield, and the high voltage plug connector includes a high voltage plug inner housing secured within the high voltage plug shield.

12. The assembly of claim 11, wherein both the high voltage cap connector and the high voltage plug connector further includes a terminal retention secondary lock configured to secure terminals attached to high voltage electrical conductors within the high voltage cap inner housing and the high voltage plug inner, respectively.

13. The assembly of claim 10, wherein the high voltage cap connector further includes a high voltage cap outer housing and the high voltage plug connector further includes a high voltage plug connector outer housing.

14. The assembly of claim 11, wherein the high voltage cap shield includes tabs configured to secure the high voltage cap shield within the high voltage cap outer housing and indentations configured to retain the high voltage cap inner housing within the high voltage cap shield, and wherein the high voltage plug shield includes tabs configured to secure the high voltage plug shield within the high voltage plug outer housing, and indentations configured to retain the high voltage plug inner housing within the high voltage plug shield.

15. The assembly of claim 10, wherein the high voltage cap shield and the high voltage plug shield are electrically connected by front springs disposed on any one of the high voltage cap shield, the high voltage plug shield, or both the high voltage cap shield and the high voltage plug shield.

16. The assembly of claim 10, wherein the high voltage interlock is further configured to prevent the mating of the low voltage cap connector and the low voltage plug connector before the high voltage cap connector and the high voltage plug connector are mated.

17. The assembly of claim 10, wherein the high voltage interlock comprises a high voltage interlock slider configured to change position within the high voltage interlock in response to the high voltage plug connector being mated with the high voltage cap connector to allow the low voltage plug connector to mate with the low voltage cap connector.

* * * * *